Patented Aug. 19, 1952

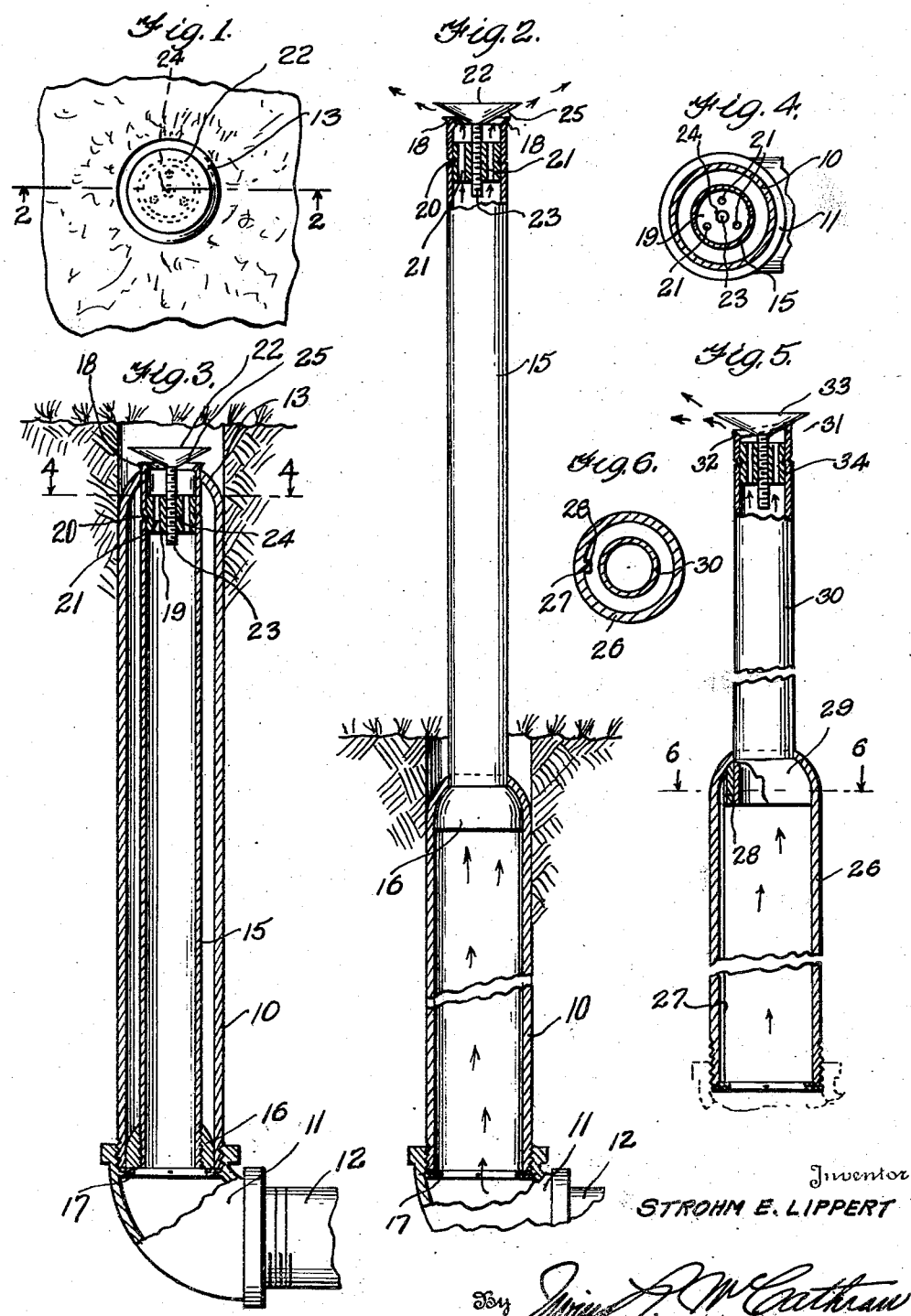

2,607,623

UNITED STATES PATENT OFFICE 2,607,623

TELESCOPIC SPRINKLER

Strohm E. Lippert, Los Angeles, Calif.

Application February 10, 1950, Serial No. 143,530

1 Claim. (Cl. 299—61)

This invention relates to telescopic sprinklers, and has for one of its objects the production of a simple and efficient means for adjustably controlling the direction and volume of flow of water out through the outer end of the sprinkler.

A further object of this invention is the production of a telescopic sprinkler which is simple in construction, efficient in operation and comprises a minimum number of parts.

Other objects and advantages of the present invention will appear throughout the following specification and claim.

In the drawing—

Figure 1 is a top plan view of the sprinkler;

Figure 2 is a vertical sectional view of the sprinkler in an extended position taken on line 2—2 of Figure 1, certain parts being shown in elevation;

Figure 3 is a vertical sectional view of the sprinkler in a retracted position;

Figure 4 is a horizontal sectional view taken on line 4—4 of Figure 3;

Figure 5 is a vertical sectional view illustrating a modified form of the invention; and Figure 6 is a horizontal sectional view taken on line 6—6 of Figure 5.

By referring to the drawing, it will be noted that 10 designates the outer pipe casing which is connected to a water supply elbow 11, which elbow in turn is connected to the water supply main or means 12. A swedge 13 is formed upon the upper end of the pipe casing 10. This swedge 13 is preferably countersunk under the surface of the ground in the manner as shown in Figures 2 and 3, and is provided with a dome-like upper face to shed water laterally away from the junction of the outer pipe 10 and the extension tube 15 described as follows.

An extension tube 15 of smaller diameter than the pipe casing 10 is slidably mounted through the swedge 13 in the manner shown in Figures 2 and 3, and this tube 15 carries a guide 16 at its lower end which normally rests upon a supporting shoulder 17 at the bottom of the pipe 10 when the tube 15 is in a retracted position. The tube 15 is provided with a slightly outwardly flared valve seat 18 at its upper end, as shown in Figures 2 and 3.

A sprinkler-head supporting nut or member 19 is carried within the outer end of the tube 15 and is preferably held in position by means of an inwardly-pressed annular bead 20 which fits in a suitable annular channel formed in the outer periphery of the supporting nut or member 19. This nut or member 19 is provided with a plurality of longitudinally extending water passages 21, preferably three in number. A sprinkler-head 22 is carried by the nut or member 19 and this head 22 is in the form of an inverted cone having a depending threaded stem 23 which is adjustably threaded through a central threaded aperture 24 formed in the sprinkler-head supporting member or nut 19. The sprinkler-head 22, which as stated above is in the nature of an inverted cone, is provided with a beveled under face 25, and the edge of the head 22 overhangs the valve seat 18, as shown in Figures 2 and 3. The head 22 is of greater diameter than the valve seat and overhangs the junction of the inner tube 15 and the outer pipe 10 to shield the slidable connection of these elements from particles of earth or other foreign particles which might prevent the reciprocation of the tube 15 within the pipe 10. By rotating the sprinkler-head 22 in the desired direction, this head may be adjusted toward or away from the seat 18 to control the volume and nature of the spray of water discharged from the sprinkler.

As shown in Figure 3, the extension tube 15 normally remains in a retracted position until the water is turned on and under the pressure of the water entering the pipe casing 10 and tube 15, the tube 15 will be extended to the position shown in Figure 2 until the guide abuts against the under face of the swedge 13, as shown. As soon as the pressure of the water is reduced sufficiently or turned off the tube 15 will automatically return to its normal position. The type of structure illustrated in Figures 1 to 4 inclusive, is preferably used in locations where it is desired to extend a spray of water in all directions around a central axis.

It should be noted that the flared valve seat 18 will constitute a stop to limit the retraction of the tube 15 into the casing 10 and when the head 22 rests upon the seat 18 the head 22 will overhang the valve seat and the junction of the tube and casing in spaced relation to the upper end of the casing 10 to prevent the head 22 from corroding and from becoming stuck upon the casing 10 when the tube 15 is retracted.

In the form shown in Figures 5 and 6, there is provided a special type of structure which is adapted to be used near the edge of a lawn or adjacent a walk-way wherein it is desired to directionally control the spray, and cause water to be sprayed only in one direction, as for instance toward one side away from the walk-away and the like. In the form shown in Figures 5 and 6, there is provided a pipe casing 26 similar to the pipe casing 10 with the exception that a longitudinally extending rib 27 is formed interiorly thereof, for fitting into a suitable notch 28 formed in one side of the guide 29 which is carried by the lower end of the extension tube 30. The extension tube 30 is provided with an open outer end which is formed on an incline toward one side providing an elevated portion 31 at one side and a lowered portion 32 upon the opposite side. A sprinkler-head 33 similar to the head 22 is provided and is carried by the sprinkler-head supporting member or nut 34 similar to the member or nut 19, the head 33 being adjustable through the nut 34. When the head 33 is adjusted in the position shown in Figure 5, it will be seen that the head 33 contacts the high portion 31 and is spaced from the low portion 32 at the end of the tube 30, thereby causing water to be discharged outwardly in a crescent-like spray in the direction as indicated by the arrows, the spray having a greater volume at its center and gradually diminishing laterally toward the ends of the spray and thereby providing a directional spray with the greater volume at a selected point. The inclined end of the tube 30 also prevents clogging of the open end of the tube and the pressure of water will tend to flush any accumulated substance outwardly and downwardly away from the inclined open outer end of the tube 30 as soon as water passes through the tube.

Certain detail changes in the construction may be employed without departing from the spirit of the invention, so long as such changes fall within the scope of the appended claim.

Having described the invention, what is claimed as new is:

A telescopic sprinkler of the class described comprising a pipe casing adapted to be connected to a water supply and countersunk under the surface of the ground in which the sprinkler is embedded, said casing having a dome-like upper end adapted to terminate below the surface of the ground and because of its dome-like formation shed water laterally toward the side of the pipe casing; said dome-like upper end of said casing having an aperture, an extension tube of smaller diameter than said pipe slidably mounted through said aperture within the casing and adapted to retract into said casing, said extension tube having an outwardly flared valve seat defining a water discharge opening at its upper end, said valve seat overhanging the junction of the pipe casing and extension tube and constituting a stop to support the valve seat above the pipe casing when the extension tube is in a retracted position, a sprinkler-head supporting member fitted within the outer end of said extension tube, an inwardly pressed bead locking said supporting member in said tube, an inverted cone-shaped sprinkler head, a stem securing said head to said supporting member, said sprinkler head being of a larger diameter than said seat and of a larger diameter than said tube and overhanging said seat and overhanging the junction of said extension tube and said casing and being in spaced relation to said casing and out of contact with the casing when the extension tube is in a retracted position to shield the junction of the tube and casing and to prevent the sprinkler head from becoming corroded and stuck upon the casing when retracted.

STROHM E. LIPPERT.

REFERENCES CITED

The following references are of record in the file of this patent:

UNITED STATES PATENTS

| Number | Name | Date |
|---|---|---|
| 1,510,930 | Enell | Oct. 7, 1924 |
| 1,847,921 | Bowers | Nov. 1, 1932 |
| 2,050,659 | Knuth | Aug. 11, 1936 |

FOREIGN PATENTS

| Number | Country | Date |
|---|---|---|
| 343,797 | Great Britain | Feb. 26, 1931 |